United States Patent
Lee et al.

(10) Patent No.: US 9,008,150 B2
(45) Date of Patent: Apr. 14, 2015

(54) INTERFERENCE SIGNAL AVOIDING DEVICE OF A FREQUENCY HOPPING SPREAD SYSTEM AND METHOD THEREOF

(75) Inventors: Yong-Hwan Lee, Seoul (KR);
Seung-Hwan Lee, Gyeonggi-do (KR);
Jin-Seok Han, Gyeonggi-do (KR)

(73) Assignee: SNU R&DB Foundation, Seoul (KR)

( * ) Notice: Subject to any disclaimer, the term of this patent is extended or adjusted under 35 U.S.C. 154(b) by 0 days.

(21) Appl. No.: 13/990,745

(22) PCT Filed: Dec. 1, 2011

(86) PCT No.: PCT/KR2011/009253
§ 371 (c)(1),
(2), (4) Date: May 30, 2013

(87) PCT Pub. No.: WO2012/074306
PCT Pub. Date: Jun. 7, 2012

(65) Prior Publication Data
US 2013/0251001 A1   Sep. 26, 2013

(30) Foreign Application Priority Data
Dec. 1, 2010   (KR) .................. 10-2010-0121564

(51) Int. Cl.
*H04B 1/713*   (2011.01)
*H04B 1/715*   (2011.01)
*H04W 28/18*   (2009.01)

(52) U.S. Cl.
CPC ........ *H04B 1/715* (2013.01); *H04B 2001/7154* (2013.01); *H04W 28/18* (2013.01)

(58) Field of Classification Search
USPC ........................... 375/130, 132, 135
See application file for complete search history.

(56) References Cited

U.S. PATENT DOCUMENTS

| | | | |
|---|---|---|---|
| 2006/0133543 A1 | 6/2006 | Linsky | |
| 2007/0064770 A1* | 3/2007 | Horiguchi | 375/133 |
| 2009/0003413 A1 | 1/2009 | Jang | |
| 2009/0086792 A1* | 4/2009 | Nishizawa et al. | 375/135 |
| 2011/0261861 A1* | 10/2011 | Lee et al. | 375/132 |

FOREIGN PATENT DOCUMENTS

| | | |
|---|---|---|
| KR | 102005-0039453 | 4/2005 |
| KR | 102007-0054013 | 5/2007 |
| KR | 102007-0096493 | 10/2007 |
| KR | 102007-0112369 | 11/2007 |
| WO | WO2010/050734 | 5/2010 |
| WO | WO 2010050734 A2 * | 5/2010 |

* cited by examiner

*Primary Examiner* — Kevin M Burd
(74) *Attorney, Agent, or Firm* — Wells St. John P.S.

(57) ABSTRACT

An interference signal avoiding device of a frequency hopping spread system and a method thereof are disclosed. A method of transmitting/receiving an interference signal avoiding signal according to the present invention includes: determining a frequency hopping channel set and a parameter of an interference signal detector in consideration of characteristics of an interference signal; detecting whether there is an interference signal with respect to frequency hopping candidate channels that are to be used for the next frequency hopping by using the determined interference signal detector; transmitting a signal through a channel that is determined by the interference signal detector that there is no interference signal among the frequency hopping candidate channels; and searching a channel through which the signal is transmitted from the frequency hopping candidate channels in order to receive the transmitted signal.

1 Claim, 4 Drawing Sheets

INTERFERENCE SIGNAL AVOIDING DEVICE OF A FREQUENCY HOPPING SPREAD SYSTEM AND METHOD THEREOF

CROSS REFERENCE TO RELATED APPLICATION

This is a 35 U.S.C. §371 application of, and claims priority to, International Application No. PCT/KR2011/009253, which was filed on Dec. 1, 2011, which claims priority to Korean Patent Application No. KR 10-2010-0121564, which was filed on Dec. 1, 2010, the entirety of all the applications are incorporated herein by reference.

TECHNICAL FIELD

The present invention relates to an apparatus and method for transmitting signals while avoiding homogeneous/heterogeneous interference signals in a frequency hopping spread spectrum system. This application claims the benefit of Korean Patent Application No. 10-2010-0121564, filed on Dec. 1, 2010, which is hereby incorporated by reference in its entirety into this application.

BACKGROUND ART

When a plurality of heterogeneous/homogeneous communication systems operated in the same frequency band are present, a Frequency Hopping Spread Spectrum (hereinafter referred to as "FHSS") system may avoid interference at high speed using a frequency hopping technique. For example, Bluetooth, which is a kind of FHSS system, reduces the influence of homogeneous/heterogeneous interferences in a band by transmitting signals while performing pseudo-random frequency hopping through 79 channels in the band at a rate of 1600 hops per second. However, when a frequency hopping channel is determined without consideration of an operation environment such as channel status, there is a disadvantage in that, when a plurality of interference signals are present in the same band, performance is greatly deteriorated. In order to mitigate this disadvantage, IEEE 802.15.1 classifies channels on which interference signals are present, and adaptively changes frequency hopping channels, thus avoiding interference in the same band. However, since such a frequency hopping technique checks frequency hopping channels on an FHSS system channel basis, the time required to classify channels is lengthened, thus causing the disadvantage of being able to cope slowly with the same channel interference. Moreover, when channels on which Frequency Dynamic (FD) interference signals are present are excluded from frequency hopping channels, the number of available frequency hopping channels remarkably decreases, and then a problem arises in that the probability of colliding with other FD interference signals greatly increases.

The present invention relates to an interference signal avoidance apparatus and method for an FHSS system, which transmit signals while avoiding interference signals in an environment in which homogeneous/heterogeneous interference signals are present in the same frequency band, and a basic concept thereof is described as follows. The present invention first detects an interference signal and changes the frequency hopping channel of the FHSS system depending on the characteristics of the detected interference signal, thereby avoiding homogeneous/heterogeneous interference signals. The present invention is configured to determine variables of an interference signal detector so that the transmission performance of the FHSS system is maximized while satisfying a detection probability for interference signals to a desired level, to instantaneously estimate whether an interference signal is present on a plurality of frequency hopping candidate channels including a subsequent frequency hopping channel by using the interference signal detector, and to transmit signals through a channel on which no interference signal is detected, thus avoiding homogenous/heterogeneous interferences in the same frequency band. In this case, the frequency hopping candidate channels are established in consideration of the characteristics of a Frequency Static (FS) interference signal, and then the influence of the FS interference signal is minimized. In particular, the present invention is configured such that, when channels on which an FS interference signal is present are detected, transmission performances appearing in a case where those channels are excluded from a set of frequency hopping channels and in a case where those channels are not excluded from the set are compared with each other, and then the set of frequency hopping channels is updated. By means of this operation, the present invention may efficiently transmit signals while avoiding homogeneous/heterogeneous interference signals in the band, even in an environment in which a plurality of homogeneous/heterogeneous interference signals are present.

DISCLOSURE

Technical Problem

The present invention is intended to solve a phenomenon in which the performance of a wireless system is deteriorated due to homogeneous/heterogeneous interference signals in an unlicensed band.

Technical Solution

Interference signals are avoided by sensing channels for the presence of interference signals and changing a frequency hopping channel.

Advantageous Effects

When the present invention is applied to Bluetooth or the like, excellent performance may be obtained compared to conventional techniques.

BEST MODE

Hereinafter, operating principles of preferred embodiments of the present invention will be described in detail with reference to the attached drawings. In the following description, detailed descriptions of related known elements or functions that may unnecessarily make the gist of the present invention obscure will be omitted. The terms described later in the present specification are defined in consideration of functions in the present invention and may vary depending on the intention or usage of a user or an operator. Therefore, the terms should be defined based on the overall content of the present specification.

It is assumed that a Frequency Hopping Spread Spectrum (FHSS) system transmits data using a frequency hopping scheme that employs M channels, wherein center frequencies of each of the M channels used here are defined by the following Equation (1):

$$F_m = F_1 + (m-1)d, \text{ for } m=1, \ldots, M \quad (1)$$

where m denotes the index of a hopping channel, $F_m$ denotes the center frequency of a hopping channel m, and d denotes a frequency interval between neighboring channels.

Figure 1:
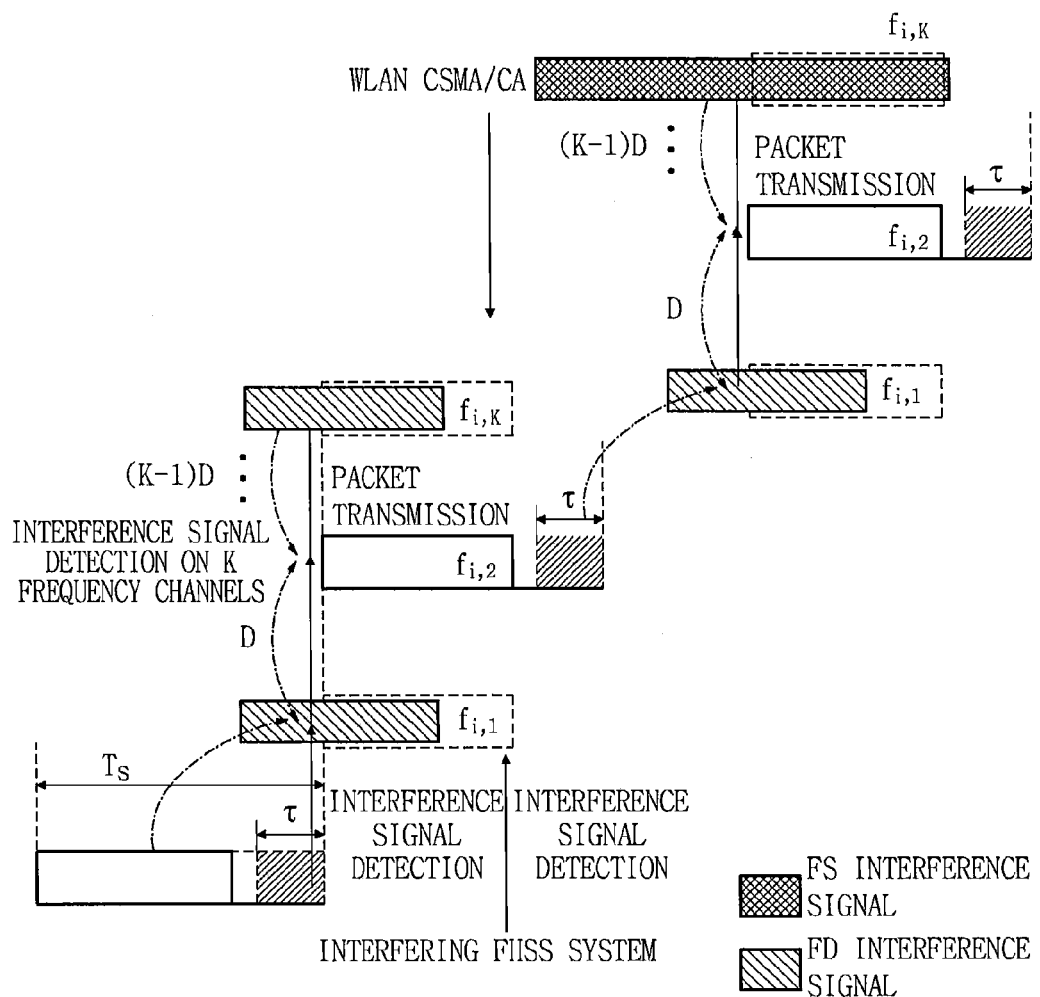
FIG. 1 is a diagram showing the configuration of channel sensing by the interference detector of an FHSS system for avoiding homogeneous/heterogeneous interference signals according to an embodiment of the present invention.

It is assumed that the index of an i-th frequency hopping channel in a set of M frequency hopping channels is $f_i$. In the present invention, the transmitter of the FHSS system determines whether an interference signal is present on K frequency hopping candidate channels for the next frequency hopping, as shown in FIG. 1, through a conventional channel sensing technique, such as an energy detector or a Fourier transform detector, before transmitting signals through channel i. In this case, since all the devices belonging to a single network (for example, a piconet in the case of Bluetooth) should be able to select identical K multiple channels for the frequency hopping, the K multiple channels are determined by the following Equation (2), based on a value D representing the interval between the center frequencies of the multiple channels, $$f_{i,k} = \underset{f_j}{\operatorname{argmin}} |f_j - \operatorname{mod}(df_i + (k-1)D, M)|, \quad (2)$$

$$\text{for } k = 1, \ldots, K \text{ and } j = 1, \ldots, M$$

(2)
where mod (x, y) denotes the remainder obtained when x is divided by y. In this case, a probability $P_{FD}(D)$ that an FD interference signal will be present on all of K multiple channels can be represented by the following Equation (3):

$$p_{FD}(D) = p\left[1 - \left(1 - \frac{T_p + \tau}{T_s M}\right)^{N_B}\right]^K \quad (3)$$

where $T_s$ and $T_p$ respectively denote the slot length (for example, 625 µs in the case of Bluetooth) and the packet length (for example, 366 µs in the case of a Bluetooth DH1 packet) of the FHSS system, and $N_B$ denotes the number of FD interference signals. Letting $P_{FS}(D)$ be a probability that an FS interference signal will be present on all of the K multiple channels, $P_{FS}(D)$ depends upon the number of FS interference signals and the value D. Therefore, the present invention minimizes the influence of FS interference signals on the detection by setting the frequency interval D between the channels, on which channel sensing is performed, to a value greater than the bandwidth W of the FS interference signals, as the following Equation (4):

$$D = F_{f_{i,k+1}} - F_{f_{i,k}} > W, \text{ for } k=1, \ldots, K-1 \quad (4)$$

In this case, a reception signal $r_{f_{i,k}}(n)$ received by the FHSS system through a channel $f_{i,k}$ can be represented by the following Equation (5):

$$r_{f_{i,k}}(n) = \begin{cases} w(n), & H_0 \\ s_{f_{i,k}}(n) + w(n), & H_1 \end{cases} \quad (5)$$

In this case, the magnitude of the reception signal received through channel $f_{i,k}$ can be calculated by the following Equation (6) with the use of an energy detector $$y_{f_{i,k}}(\tau_n) = \frac{1}{L} \sum_{n=0}^{L-1} |r_{f_{i,k}}(n)|^2 \quad (6)$$

where L denotes the number of reception signal samples required to detect an interference signal and is determined by $L = \tau_n \tilde{f}_s$. In this case, $\tilde{f}_s$ denotes the sampling frequency, $\tau_n$ denotes the detection time of the interference signal detector starting from time $t_n = nT_L$ and is periodically determined by the procedure of FIG. 4, and $T_L$ denotes the update period. The present invention determines whether an interference signal is present on one of K candidate channels used for the next frequency hopping, as given by the following Equation (7), at step 201 in FIG. 2, $$\varphi_{f_{i,k}} = \begin{cases} 0, & y_{f_{i,k}}(\tau_n) < \lambda_n, \\ 1, & y_{f_{i,k}}(\tau_n) \geq \lambda_n, \end{cases} \text{ for } k = 1, \ldots, K-1 \quad (7)$$

where $\lambda_n$ denotes a threshold value required to determine whether an interference signal is present, and is determined by the following Equation (8) when a desired detection probability is assumed to be $\overline{P}_d$, $$\lambda_n = \sigma_w^2(1+\eta)\left(1 + \frac{Q^{-1}(\overline{P}_d)}{\sqrt{\tau_n \tilde{f}_s}}\right) \quad (8)$$

Figure 2:
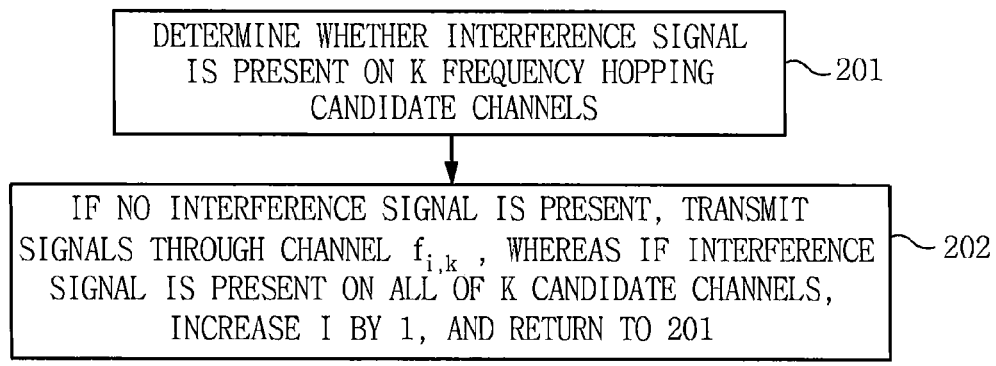
FIG. 2 is a diagram showing a procedure for detecting interference and transmitting packets according to an embodiment of the present invention.

When the interference signal detector detects no interference signal on a channel $f_{i,1}$, the FHSS transmitter transmits signals through channel $f_{i,1}$ regardless of the presence of interference signal on the other (K−1) channels, at step 202 in FIG. 2. However, when the interference signal detector detects the presence of an interference signal channel $f_{i,1}$, the process returns to step 201 of FIG. 2, where after the detection of the absence of an interference signal on the next candidate channel $f_{i,2}$, signals are transmitted through channel $f_{i,2}$ at step 202 of FIG. 2. If $\phi_{f_{i,2}}=1$, the process returns to step 201 of FIG. 2, where the same procedure is repeated for the rest of candidate channels. By means of the above procedure, the transmitter of the FHSS system transmits signals through one of the K frequency hopping candidate channels, which is not affected by an interference signal. When an interference signal is present on all of the K frequency hopping candidate channels, the transmitter does not transmits signals, increases the value of i by 1, and returns to step 201, where the same procedure is repeated for K candidate channels used for the next frequency hopping.

Figure 3:
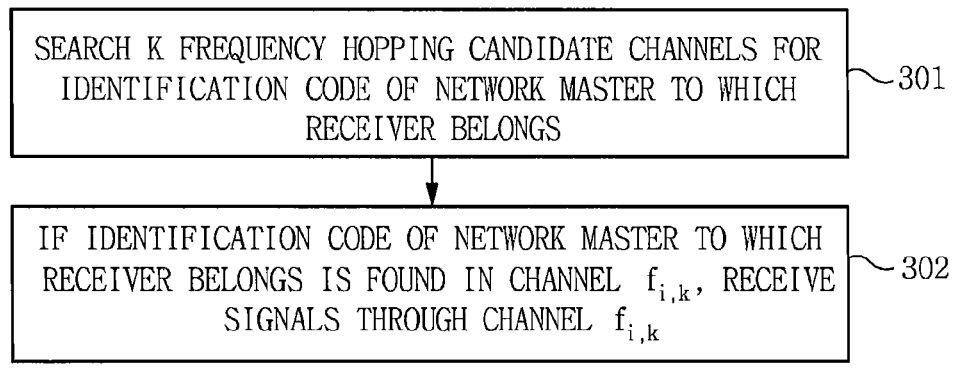
FIG. 3 is a diagram showing a procedure for receiving packets according to an embodiment of the present invention.

The receiver of the FHSS system receives signals transmitted from the transmitter of the FHSS system though the procedure shown in FIG. 3. The receiver of the FHSS system searches for the identification code of its network master through the K frequency hopping candidate channels during a time interval of $T_{AC}$ ($0 < T_{AC} < T_p$) at step 301 of FIG. 3. When the receiver of the FHSS system detects the identification code of the network master on a candidate channel $f_{i,k}$, it receives signals transmitted from the transmitter of the FHSS system through channel $f_{i,k}$ during a subsequent time interval of ($T_p - T_{AC}$) (for example, 294 μs in the case of a Bluetooth DH1 packet) at step 302 of FIG. 3. Through the above procedure, the proposed technique may allow the FHSS system efficiently avoid the presence of FS and FD co-channel interferences by transmitting signals through a channel on which FS and FD interference signals are not present, minimizing a signal transmission delay caused by the co-channel interference signal.

The transmission performance of the FHSS system with the use of the above procedure can be represented by the following Equation (9):

$$R(\tau_n) = (1 - p_{H_1}(\tau_n))(1 - p_f(\tau_n))\frac{N_{bits}}{\overline{T}_{H_0}} + p_{H_1}(\tau_n)(1 - p_d(\tau_n))\frac{N_{bits}}{\overline{T}_{H_1}} \quad (9)$$

where $N_{bits}$ denotes the number of bits of a transmitted signal, $p_f(\tau_n)$ and $p_d(\tau_n)$ respectively denote the probability of false alarm and true detection of interference signals associated with the detection time, and $\overline{T}_{H_0}$ and $\overline{T}_{H_1}$ respectively denote average signal transmission times without and with the presence of interference signal during the detection time, which can be represented by the following Equations (10) and (11), respectively:

$$\overline{T}_{H_0} = 2kT_s + 2kT_s \sum_{j=1}^{\infty} jq^j(1-q) \quad (10)$$
$$= \frac{2kT_s}{1-q}$$

$$\overline{T}_{H_1} = 2kT_s + 2kT_s \sum_{j=1}^{\infty} j(q')^j(1-q') \quad (11)$$
$$= \frac{2kT_s}{1-q'}$$

where q and q' denote the signal transmission error rate of the FHSS system due to the presence of channel noise and interference signals, respectively, and $p_{H_1}(\tau_n)$ denotes a probability that an FS or FD interference signal will be preset in all of the K multiple candidate channels.

The procedure in FIG. 2 improves the transmission performance of the FHSS system by instantaneously avoiding the presence of homogeneous/heterogeneous interference signals on the frequency hopping channels. However, since the presence of an FS interference signal often occurs for a relatively long time in a frequency band wider than that of the hopping channels of the FHSS system, it may cause transmission delay of the FHSS system, deteriorating the transmission efficiency. In order to alleviate such a transmission delay problem, the present invention periodically detects the presence of an FS interference signal on channels belonging to a set of channels, $\Theta(t_{n-1})$, used for frequency hopping at time $t_{n-1} = (n-1)/T_L$ at a periodic interval of $T_L$, based on both an Interference Signal Detection Ratio (ISDR) and a signal transmission error rate which are obtained during a period $[t_{n-1}, t_n]$. Thereafter, through the procedure of FIG. 4, the present invention updates a channel set $\Theta(t_n)$ to be used for the frequency hopping at time $t_n = nT_L$, by excluding the channels, on which the FS interference signal is present, from the frequency hopping channel set.

Let $\Gamma(t_{n-1})$ be a set of channels on which an FS interference signal is present among the channels in set $\Theta(t_{n-1})$. Then, a set of channels, $\tilde{\Theta}(t_{n-1})$, which excludes the channels on which the FS interference signal is present from the set $\Theta(t_{n-1})$, may be represented by the following Equation (12):

$$\tilde{\Theta}(t_{n-1}) = \Theta(t_{n-1}) - \Gamma(t_{n-1}) \quad (12)$$

For ease of description, define $\zeta_i$ by the index of an i-th channel in the set $\tilde{\Theta}(t_{n-1})$ and $\phi(t_{n-1}, t_n, \zeta_i)$ by the ISDR value of channel $\zeta_i$ measured during time interval $[t_{n-1}, t_n]$, which can be represented by the following Equation (13), $$\phi(t_{n-1}, t_n, \zeta_i) = \frac{\upsilon(t_{n-1}, t_n, \zeta_i)}{\omega(t_{n-1}, t_n, \zeta_i)} \quad (13)$$

where $\omega(t_{n-1}, t_n, \zeta_i)$ and $\upsilon(t_{n-1}, t_n, \zeta_i)$ respectively denote the number of channel sensings and the number of interference detections on channel $\zeta_i$ during time interval $[t_{n-1}, t_n]$. Then, the average ISDR value of channels in set $\tilde{\Theta}(t_{n-1})$ can be represented by the following Equation (14), $$\overline{\phi}(t_{n-1}, t_n) = \frac{1}{|\tilde{\Theta}(t_{n-1})|} \sum_{i=1}^{|\tilde{\Theta}(t_{n-1})|} \phi(t_{n-1}, t_n, \zeta_i). \quad (14)$$

A probability $p_{H_1}(\tau_{n-1})$ that an FD interference signal will be present within detection time $\tau_{n-1}$ can be represented in terms of the sensing performance of the interference detector by the following Equation (15):

$$p_{H_1}(\tau_{n-1}) = \frac{\overline{\phi}(t_{n-1}, t_n) - p_f(\tau_{n-1})}{\overline{p}_d - p_f(\tau_{n-1})} \quad (15)$$

Figure 4:
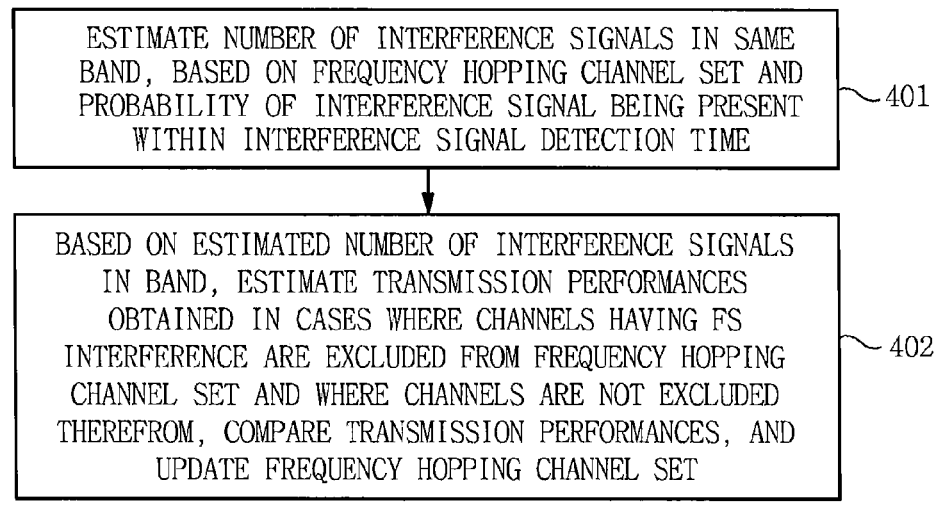
FIG. 4 is a diagram showing a procedure for determining a set of frequency hopping channel set according to an embodiment of the present invention.

It can be shown from Equation (3) at step 401 in FIG. 4 and Equation (15) that the number of FD co-channel interference signals can be estimated by the following Equation (16)

$$\tilde{N}_B = \frac{\log\left(1 - \frac{|\Theta(t_{n-1})p_{H_1}(\tau_{n-1})|}{|\Theta(t_{n-1})|}\right)}{\log\left(1 - \frac{T_p + \tau_{n-1}}{T_s|\Theta(t_{n-1})|}\right)}. \quad (16)$$

It can be shown from Equation (3) that the transmission performance of the FHSS system with the use of the frequency hopping channel set $\tilde{\Theta}(t_{n-1})$ and $\Theta(t_{n-1})$ can be estimated by the following Equations (17) and (18), respectively, $$\tilde{R}(\tau_{n-1}) \Box \frac{N_{bits}(1 - p_f(\tau_{n-1}))}{\overline{T}_{H_0}} \left\{ 1 - \left[1 - \left(1 - \frac{T_p + \tau_{n-1}}{T_s|\tilde{\Theta}(t_{n-1})|}\right)^{\tilde{N}_B}\right]^K \right\} \quad (17)$$

-continued $$R(\tau_{n-1}) \Box \frac{N_{bits}(1 - p_f(\tau_{n-1}))\left(1 - \frac{\bar{\pi}(t_{n-1}, t_n) - p_f(\tau_{n-1})}{\bar{p}_d - p_f(\tau_{n-1})}\right)}{\bar{T}_{H0}} \quad (18)$$

where $\bar{\pi}(t_{n-1}, t_n)$ denotes the average ISDR value measured during time interval $[t_{n-1}, t_n]$. By comparing the transmission performances with the use of the frequency hopping channel sets $\Theta(t_{n-1})$ and $\tilde{\Theta}(t_{n-1})$ at step 402 of FIG. 4, a frequency hopping channel set determination unit updates the frequency hopping channel set $\Theta(t_n)$ to be used at time $t_n = nT_L$, as given by the following Equation (19), $$\Theta(t_n) = \begin{cases} \Theta(t_{n-1}), & \text{if } R(\tau_{n-1}) \geq \tilde{R}(\tau_{n-1}) \\ \Theta(t_{n-1}) - \Gamma(t_{n-1}), & \text{otherwise} \end{cases} \quad (19)$$

In this case, the condition $R(\tau_{n-1}) \geq \tilde{R}(\tau_{n-1})$ in Equation (19) can be converted into the following Equation (20):

$$\bar{\pi}(t_{n-1}, t_n) < \lambda_{ISDR} \quad (20)$$

where $\lambda_{ISDR}$ denotes a threshold value to decide whether or not to exclude channels on which an FS interference signal is present from the frequency hopping channel set, which can be obtained by applying Equations (17) and (18) to Equation (19) as $$\lambda_{ISDR} = (\bar{p}_d - p_f(\tau_{n-1}))\left[1 - \left(1 - \frac{T_p + \tau_{n-1}}{T_s|\tilde{\Theta}(t_{n-1})|}\right)^{\tilde{N}_B}\right]^K + p_f(\tau_{n-1}). \quad (21)$$

Figure 5:
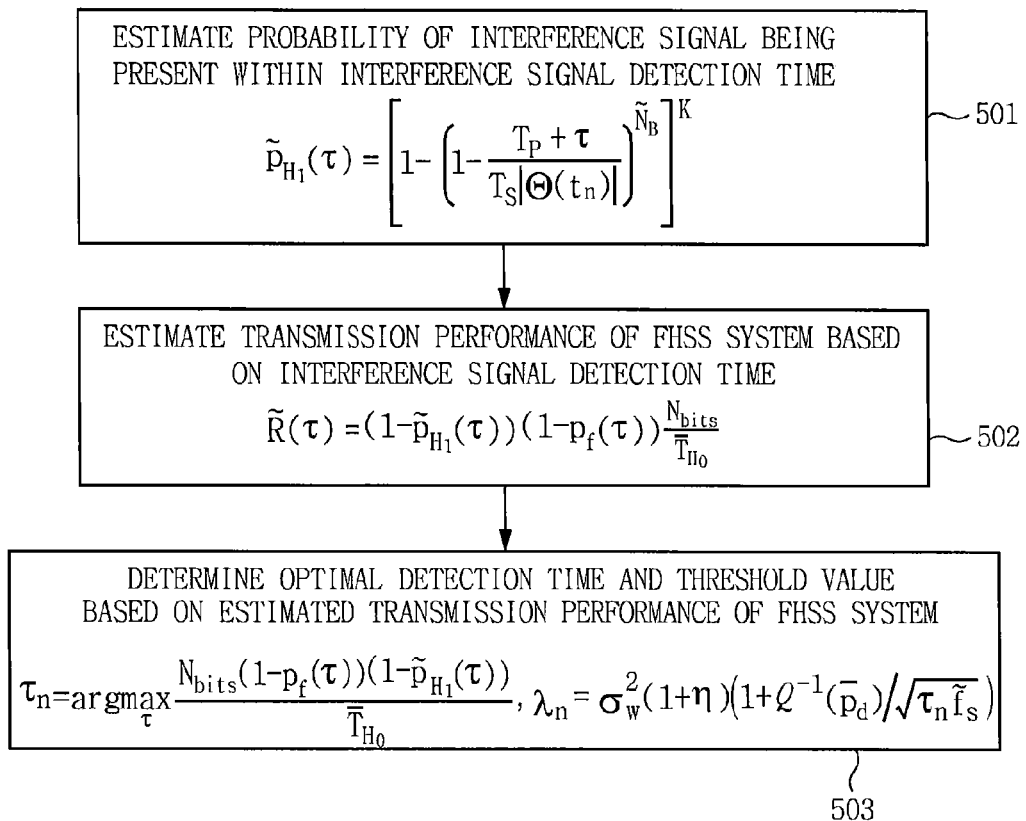
FIG. 5 is a diagram showing a procedure for determining interference signal detection time and threshold value according to an embodiment of the present invention.

Thereafter, as shown in FIG. 5, the present invention determines the detection time $\tau_n$ and the threshold value $\lambda_n$ of the interference signal detector to be used at time $t_n$, in order to maximize the transmission performance of the FHSS system while satisfying a detection probability for interference signals to a desired level with the use of frequency hopping channel set $\Theta(t_n)$ which is updated through the procedure of FIG. 4. The longer the detection time $\tau_n$, the higher the detection probability and the lower the false alarm probability. However, the longer the detection time $\tau_n$, the higher the probability of the presence of an interference signal during the detection time. On the contrary, the shorter the detection time $\tau_n$, the lower the probability of the presence of an interference signal during the detection time, yielding the improvement of transmission performance of the FHSS system. However, the shorter the detection time $\tau_n$, the lower the detection probability and the higher the false alarm probability. Considering the tradeoff between the detection performance and the transmission performance, the present invention determines the threshold value and the interference signal detection time of the interference signal detector to maximize the transmission performance of the FHSS system.

The present invention can estimate the presence probability of an interference signal during detection time $\tau$, at step 501 in FIG. 5, as given by the following Equation (22), $$\tilde{p}_{H1}(\tau) = \left[1 - \left(1 - \frac{T_p + \tau}{T_s|\Theta(t_n)|}\right)^{\tilde{N}_B}\right]^K; \quad (22)$$

$$0 < \tau < T_s - T_p.$$

Thereafter, the present invention can estimate the transmission performance of the FHSS system achievable during the detection time $\tau$ at step 502 in FIG. 5, as given by the following Equation (23), $$\tilde{R}(\tau) = (1 - \tilde{p}_{H1}(\tau))(1 - p_f(\tau))\frac{N_{bits}}{\bar{T}_{H0}}. \quad (23)$$

Based on the estimated results, the present invention determines the interference signal detection time and the threshold value of the interference signal detector to be used at time $t_n$ at step 503 in FIG. 5, as given by the following Equations (24) and (25), respectively, $$\tau_n = \arg\max_\tau \tilde{R}(\tau) \quad (24)$$

$$= \arg\max_\tau (1 - \tilde{p}_{H1}(\tau))(1 - p_f(\tau))\frac{N_{bits}}{\bar{T}_{H0}};$$

$$0 < \tau < T_s - T_p$$

$$\lambda_n = \sigma_w^2(1 + \eta)\left(1 + \frac{Q^{-1}(\bar{p}_d)}{\sqrt{\tau_n \tilde{f}_s}}\right). \quad (25)$$

Thereafter, when the present invention returns to step 201 of FIG. 2, where the transmitter transmits signals though a set of frequency hopping channels determined through the procedure of FIG. 4, it can transmit signals through channels on which no interference signal is present, based the decision associated with the interference signal detection time and the threshold value for interference signal detection, which are determined through the procedure of FIG. 5, thus efficiently avoiding the presence of homogeneous/heterogeneous co-channel interferences during the transmission. In this case, in order to alleviate performance deterioration due to the increase of distance between the transmitter and the receiver, when the present invention returns to step 201 of FIG. 2, where the transmitter transmits signals though a set of frequency hopping channels determined through the procedure of FIG. 4, it estimates the Signal-to-Noise power Ratio (SNR) $\bar{\gamma}(t_{n-1}, t_n)$ of channels on which no interference signal is present, and then determines a transmission power value $P_{out}(t_n)$ during the next period, as given by the following Equation (26):

$$P_{out}(t_n) = \min\left(P_{max}, \max\left(P_{min}, \frac{\hat{\gamma}}{\bar{\gamma}(t_{n-1}, t_n)} P_{out}(t_{n-1})\right)\right) \quad (26)$$

where $\hat{\gamma}$ denotes a desired target SNR, and $P_{min}$ and $P_{max}$ denote the minimum and the maximum allowable transmission power of the system, respectively. Through this procedure, the present invention determines the transmission power without being affected by the distance between the transmitter and the receiver, enabling to provide desired performance. Through this procedure, the present invention can efficiently transmit signals while avoiding homogeneous/heterogeneous co-channel interference signals even in environments in which a plurality of homogeneous/heterogeneous co-channel interference signals are present.

What is claimed is:

1. A method of transmitting/receiving signals while avoiding interference signals, the method transmitting/receiving signals while avoiding homogeneous/heterogeneous interference signals present in an identical band in a Frequency Hopping Spread Spectrum (FHSS) system, comprising:

determining a frequency hopping channel set and a variable of an interference signal detector in consideration of characteristics of an interference signal;

detecting whether an interference signal is present on frequency hopping candidate channels to be used for next frequency hopping using the determined interference signal detector;

transmitting signals through a channel on which it is determined by the interference signal detector that no interference signal is present, among the frequency hopping candidate channels;

searching the frequency hopping candidate channels for a channel through which the signals are transmitted, and receiving the signals through the found channel; and performing transmission power control using Signal-to-Noise power Ratio (SNR) values of channels on which no interference signal is present, when searching the frequency hopping candidate channels for the channel through which the signals are transmitted and transmitting the signals; and wherein determining the frequency hopping channel set and the variable of the interference signal detector in consideration of characteristics of the interference signal comprises:

estimating a number of interference signals in a band;

determining the frequency hopping channel set based on the estimated number of interference signals; and determining the variable of the interference signal detector based on the estimated number of interference signals and the determined frequency hopping channel set; and wherein determining the variable of the interference signal detector based on the estimated number of interference signals and the determined frequency hopping channel set is configured to determine a detection time $\tau_n$ and a threshold value $\lambda_n$ of the interference signal detector starting from time $t_n$ so that transmission performance of the FHSS system is maximized while satisfying a detection probability for interference signals to a desired level;

wherein detecting whether the interference signal is present on the frequency hopping candidate channels to be used for next frequency hopping using the determined interference signal detector comprises:

determining K frequency hopping candidate channels to be used for next frequency hopping; and instantaneously detecting whether an interference signal is present on the determined K frequency hopping candidate channels; and wherein instantaneously detecting whether the interference signal is present on the determined K frequency hopping candidate channels is configured to instantaneously detect whether an interference signal is present on an identical channel via a channel sensing technique, with respect to the determined K frequency hopping candidate channels by using the detection time $\tau_n$ and the threshold value $\lambda_n$ before transmitting signals through the channel $f_i$;

wherein transmitting the signals through the channel on which it is determined by the interference signal detector that no interference signal is present, among the frequency hopping candidate channels, is configured to repeat a procedure for, if it is determined by the interference signal detector that no interference signal is present on a channel $f_{i,1}$, transmitting signals through the channel $f_{i,1}$ regardless of whether an interference signal is present on subsequent K−1 channels and for, if it is determined by the interference signal detector that an interference signal is present on the channel $f_{i,1}$, determining whether an interference signal is present on a channel $f_{i,2}$ and a transmitter of the FHSS system transmitting signals through the channel $f_{i,2}$ only if it is determined that no interference signal is present on the channel $f_{i,2}$, thus searching the K frequency hopping candidate channels for a first channel on which no interference signal is present and transmitting signals through the first channel, and is also configured to, if it is determined that all of the K frequency hopping candidate channels are influenced by interference signals, stop transmitting signals until next frequency hopping time; and wherein performing the transmission power control using the SNR values of channels on which no interference signal is present when searching the frequency hopping candidate channels for the channel through which the signals are transmitted and transmitting the signals is configured to estimate SNR values $\bar{\gamma}(t_{n-1}, t_n)$ of channels on which no interference signal is present when transmitting signals through the determined frequency hopping channel set, and then determine a transmission power value $P_{out}(t_n)$ during a next period by the following Equation (4):

$$P_{out}(t_n) = \min\left(P_{max}, \max\left(P_{min}, \frac{\hat{\gamma}}{\bar{\gamma}(t_{n-1}, t_n)} P_{out}(t_{n-1})\right)\right) \quad (4)$$

wherein $\hat{\gamma}$ denotes a target SNR value and $P_{min}$ and $P_{max}$ respectively denote minimum and maximum possible transmission power values.

* * * * *